(12) United States Patent
Curtin et al.

(10) Patent No.: US 11,632,466 B2
(45) Date of Patent: Apr. 18, 2023

(54) SYSTEMS AND METHODS FOR COMMUNICATION PROCESSING

(71) Applicant: American TEL-A-Systems, Inc., McFarland, WI (US)

(72) Inventors: Thomas V. Curtin, Madison, WI (US); Kevin Mark Beale, Stoughton, WI (US); Paul L. Hansen, McFarland, WI (US); Wayne Paul Waldner, Richland Center, WI (US)

(73) Assignee: AMERICAN TEL-A-SYSTEMS, INC., McFarland, WI (US)

( * ) Notice: Subject to any disclaimer, the term of this patent is extended or adjusted under 35 U.S.C. 154(b) by 58 days.

(21) Appl. No.: 16/775,006

(22) Filed: Jan. 28, 2020

(65) Prior Publication Data

US 2021/0234961 A1 Jul. 29, 2021

(51) Int. Cl.
*H04M 3/51* (2006.01)
*H04M 3/42* (2006.01)
(Continued)

(52) U.S. Cl.
CPC ...... *H04M 3/5183* (2013.01); *H04L 65/1063* (2013.01); *H04M 3/42059* (2013.01); *H04M 3/42102* (2013.01); *H04M 3/436* (2013.01); *H04M 3/4931* (2013.01); *H04M 3/5166* (2013.01); *H04M 3/5231* (2013.01); *H04M 3/5235* (2013.01); *G06F 16/252* (2019.01);
(Continued)

(58) Field of Classification Search
CPC ........... H04M 3/5183; H04M 3/42059; H04M 3/42102; H04M 3/436; H04M 3/4931; H04M 3/5166; H04M 3/5231; H04M 3/5235; H04M 2203/558; H04L 65/1063; G06F 16/252
See application file for complete search history.

(56) References Cited

U.S. PATENT DOCUMENTS 5,703,943 A * 12/1997 Otto .................. H04M 3/51
379/245
6,088,437 A 7/2000 Amick
(Continued)

*Primary Examiner* — Ahmad F. Matar
*Assistant Examiner* — Jirapon Intavong
(74) *Attorney, Agent, or Firm* — Baker Botts L.L.P.

(57) ABSTRACT

A system comprises a service platform comprising an applications server. The applications server is configured to receive an inbound communication, route the inbound communication to a speech-enabled intelligent script, the speech-enabled intelligent script comprising one or more of predetermined prompts and dynamically-generated prompts, and determine a source of the inbound communication and a destination of the inbound communication. The applications server is configured to determine that at least one prior inbound communication directed to the destination has been received from the source of the inbound communication. The applications server is configured to receive, in response to at least one predetermined prompt or dynamically-generated prompt, a request for direct contact information associated with the destination of the inbound communication. The applications server is configured to send, to the source of the inbound communication, a message comprising the direct contact information for the destination of the inbound communication.

21 Claims, 5 Drawing Sheets

(51) Int. Cl.
*H04L 65/1063* (2022.01)
*H04M 3/493* (2006.01)
*H04M 3/436* (2006.01)
*H04M 3/523* (2006.01)
*H04L 65/1053* (2022.01)
*G06F 16/25* (2019.01)
*H04L 65/1104* (2022.01)

(52) U.S. Cl.
CPC ....... *H04L 65/1053* (2013.01); *H04L 65/1104* (2022.05); *H04M 2203/558* (2013.01)

(56) References Cited

U.S. PATENT DOCUMENTS

| | | |
|---|---|---|
| 6,445,775 B1 | 9/2002 | Morganstein et al. |
| 7,103,162 B1 | 9/2006 | Cesario, Jr. |
| 7,136,458 B1 | 11/2006 | Zellner et al. |
| 7,274,776 B1 | 9/2007 | Virzi et al. |
| 8,189,760 B2 | 5/2012 | Levine |
| 8,385,515 B2 | 2/2013 | Winslow et al. |
| 8,494,144 B2 | 7/2013 | Hodge |
| 8,594,298 B2 | 11/2013 | Klein et al. |
| 8,744,059 B2 | 6/2014 | Ganganna |
| 8,750,469 B1 | 6/2014 | Van Haaften et al. |
| 9,948,775 B2 | 4/2018 | Vendrow |
| 10,057,419 B2 | 8/2018 | Chan et al. |
| 10,110,739 B2 | 10/2018 | Quilici et al. |
| 2005/0041794 A1* | 2/2005 | Cox ........................ H04M 3/51 379/218.02 |
| 2006/0210032 A1 | 9/2006 | Grech et al. |
| 2006/0256932 A1* | 11/2006 | Bushey .................. G06Q 20/40 379/67.1 |
| 2008/0247529 A1 | 10/2008 | Barton et al. |
| 2011/0194684 A1* | 8/2011 | Ristock ............... H04M 3/5238 379/265.02 |
| 2016/0050320 A1* | 2/2016 | Montenegro ......... H04M 3/523 379/265.09 |
| 2016/0094437 A1 | 3/2016 | On |
| 2018/0020093 A1 | 1/2018 | Bentitou et al. |

* cited by examiner

SYSTEMS AND METHODS FOR COMMUNICATION PROCESSING

TECHNICAL FIELD

The present disclosure relates, in general, to wireless communications and, more particularly, to systems and methods for communications processing.

BACKGROUND

Call centers are designed to connect callers to agents, company representatives, or other individuals for a variety of purposes. For instance, organizations of various types rely on call-center services to manage incoming calls and/or other types of inbound communications, including calls from prospective and existing customers. Customer experiences with call centers are important to the successful operation of the business. For example, if a prospective customer encounters difficulty being connected to the business' sales team, the business owner may lose a sale. For this reason, the ability to quickly and efficiently process calls and other inbound communications is important to the success of the call center. Systems have been developed to facilitate the handling of incoming calls to a call center. These systems, however, suffer from significant deficiencies.

For example, in many cases the call center serves as the gatekeeper to an organization. Incoming calls and other types of inbound communications directed to the organization may be routed first to an agent at the call center before the caller can be connected to the party the caller is attempting to reach. Using a call center as an intermediary in this fashion has some advantages. In particular, it allows for at least a minimal level of call screening to be performed before calls are allowed to proceed to their destination. This prevents unwanted interruptions for organization personnel (e.g., in the form of robocalls or unsolicited sales calls). But this approach is also problematic for a number of reasons. For instance, requiring every inbound communication to be transferred first to an agent puts a significant strain on call-center and system resources, tying up agents and available lines of communication. Moreover, such a one-size-fits all approach lacks the flexibility needed to effectively process calls and other inbound communications. The lack of flexibility may result in inappropriate handling of the communication. For instance, calls or other inbound communications that should be prioritized may be delayed, potentially resulting in loss of sales and diminished customer satisfaction. Thus, there is a need for improved systems and methods of communications processing that are more efficient and provide the flexibility to allow inbound communications to be processed in a manner that is suitable for the organization utilizing the services of the call center.

In view of the need for more efficient and flexible systems and methods, another important consideration for call center systems is the ability to maintain the gatekeeper functionality of the call center. For instance, it would not be desirable to eliminate the ability to screen calls in its entirety, because doing so would expose organization personnel to unwanted interruptions. Thus, there is a further need for improved systems and methods that provide the requisite efficiency and flexibility while at the same time insulating organization personnel from unwanted communications.

SUMMARY

To address the foregoing problems with existing approaches, disclosed is a system. The system comprises a service platform comprising an applications server, the applications server configured to communicatively couple to a softswitch and a database. The applications server is configured to receive an inbound communication. The applications server is configured to route the inbound communication to a speech-enabled intelligent script, the speech-enabled intelligent script comprising one or more of predetermined prompts and dynamically-generated prompts. The applications server is configured to determine a source of the inbound communication and a destination of the inbound communication. The applications server is configured to determine that at least one prior inbound communication directed to the destination has been received from the source of the inbound communication. The applications server is configured to receive, in response to at least one predetermined prompt or dynamically-generated prompt, a request for direct contact information associated with the destination of the inbound communication. The applications server is configured to send, to the source of the inbound communication, a message comprising the direct contact information for the destination of the inbound communication.

In certain embodiments, the applications server may be further configured to route the inbound communication to the destination.

In certain embodiments, the at least one predetermined prompt or dynamically-generated prompt may comprise an audio recording indicating that direct contact information associated with the destination of the inbound communication can be requested. The request for direct contact information associated with the destination of the inbound communication may comprise one of: speech input; and a keypad selection.

In certain embodiments, the applications server may be further configured to send, to the destination of the inbound communication, a request for permission to route the inbound communication to the destination, the request comprising information identifying the source of the inbound communication. In certain embodiments, the applications server may be further configured to: receive, from the destination of the inbound communication, permission to route the inbound communication to the destination; and route the inbound communication to the destination in response to receiving the permission. In certain embodiments, the applications server may be further configured to receive, from the destination of the inbound communication, a response to the request for permission indicating that the service platform is not permitted to route the inbound communication to the destination. In certain embodiments, the applications server may be further configured to, in response to receiving the response to the request for permission indicating that the service platform is not permitted to route the inbound communication to the destination, send contact information for the source of the inbound communication to the destination of the inbound communication. In certain embodiments, the applications server may be further configured to: in response to receiving the response to the request for permission indicating that the service platform is not permitted to route the inbound communication to the destination, prompt the source of the inbound communication to leave one of a voice message or a text message for the destination; obtain the voice message or the text message from the source of the inbound communication; and send the obtained voice message or text message to the destination of the inbound communication.

In certain embodiments, the applications server may be further configured to: receive a subsequent inbound communication from the source; and route the subsequent inbound communication directly to the destination.

In certain embodiments, the inbound communication may comprise one of: a call; and a text message.

Also disclosed is a method. The method comprises receiving an inbound communication at a service platform, the service platform comprising an applications server configured to communicatively couple to a softswitch and a database. The method comprises routing the inbound communication to a speech-enabled intelligent script, the speech-enabled intelligent script comprising one or more of predetermined prompts and dynamically-generated prompts. The method comprises determining, by the service platform, a source of the inbound communication and a destination of the inbound communication. The method comprises determining, by the service platform, that at least one prior inbound communication directed to the destination has been received from the source of the inbound communication. The method comprises receiving, at the service platform in response to at least one predetermined prompt or dynamically-generated prompt, a request for direct contact information associated with the destination of the inbound communication. The method comprises sending, to the source of the inbound communication, a message comprising the direct contact information for the destination of the inbound communication.

In certain embodiments, the method may further comprise routing the inbound communication to the destination.

In certain embodiments, the at least one predetermined prompt or dynamically-generated prompt may comprise an audio recording indicating that direct contact information associated with the destination of the inbound communication can be requested. The request for direct contact information associated with the destination of the inbound communication may comprise one of: speech input; and a keypad selection.

In certain embodiments, the method may comprise sending, to the destination of the inbound communication, a request for permission to route the inbound communication to the destination, the request comprising information identifying the source of the inbound communication. In certain embodiments, the method may further comprise receiving, at the service platform from the destination of the inbound communication, permission to route the inbound communication to the destination; and routing the inbound communication to the destination in response to receiving the permission. In certain embodiments, the method may further comprise: receiving, at the service platform from the destination of the inbound communication, a response to the request for permission indicating that the service platform is not permitted to route the inbound communication to the destination. In certain embodiments, the method may further comprise in response to receiving the response to the request for permission indicating that the service platform is not permitted to route the inbound communication to the destination, sending contact information for the source of the inbound communication to the destination of the inbound communication. In certain embodiments, the method may further comprise: in response to receiving the response to the request for permission indicating that the service platform is not permitted to route the inbound communication to the destination, prompting the source of the inbound communication to leave one of a voice message or a text message for the destination; obtaining the voice message or the text message from the source of the inbound communication; and sending the obtained voice message or text message to the destination of the inbound communication.

In certain embodiments, the method may further comprise: receiving a subsequent inbound communication from the source; and routing the subsequent inbound communication directly to the destination.

In certain embodiments, the inbound communication may comprise one of: a call; and a text message.

Also disclosed is a non-transitory computer-readable medium comprising instructions that, when executed by a processor, are configured to perform a method. The method comprises receiving an inbound communication at a service platform, the service platform comprising an applications server configured to communicatively couple to a softswitch and a database. The method comprises routing the inbound communication to a speech-enabled intelligent script, the speech-enabled intelligent script comprising one or more of predetermined prompts and dynamically-generated prompts. The method comprises determining, by the service platform, a source of the inbound communication and a destination of the inbound communication. The method comprises determining, by the service platform, that at least one prior inbound communication directed to the destination has been received from the source of the inbound communication. The method comprises receiving, at the service platform in response to at least one predetermined prompt or dynamically-generated prompt, a request for direct contact information associated with the destination of the inbound communication. The method comprises sending, to the source of the inbound communication, a message comprising the direct contact information for the destination of the inbound communication. The method comprises sending, to the destination of the inbound communication, a request for permission to route the inbound communication to the destination, the request comprising information identifying the source of the inbound communication. The method comprises receiving, at the service platform from the destination of the inbound communication, permission to route the inbound communication to the destination. The method comprises routing the inbound communication to the destination in response to receiving the permission.

In certain embodiments, the method may further comprise: receiving a subsequent inbound communication from the source; and routing the subsequent inbound communication directly to the destination.

In certain embodiments, the at least one predetermined prompt or dynamically-generated prompt may comprise an audio recording indicating that direct contact information associated with the destination of the inbound communication can be requested. The request for direct contact information associated with the destination of the inbound communication may comprise one of: speech input; and a keypad selection.

Certain embodiments of the present disclosure may provide one or more technical advantages. For example, certain embodiments may advantageously provide for flexible communications processing. As another example, certain embodiments may advantageously reduce the amount of call-center and system resources required to process calls. As still another example, certain embodiments may advantageously provide for effective call screening without burdening system resources. As yet another example, certain embodiments may advantageously enable an inbound communication to be directed to its destination more quickly. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is

DETAILED DESCRIPTION

Figure 1:
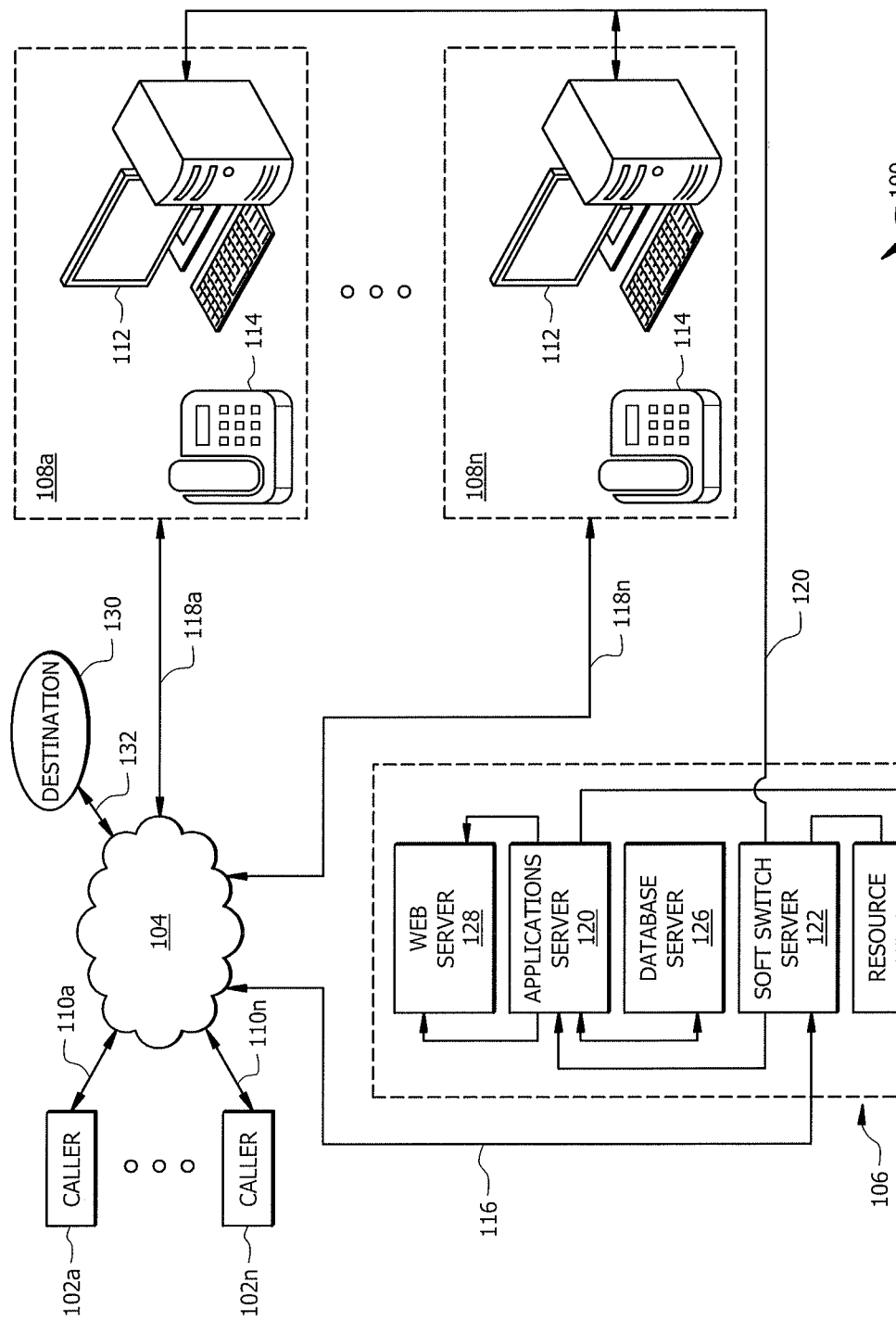
FIG. 1 is a block diagram of an example communication system, in accordance with certain embodiments.

As described above, call centers often serve as the gatekeeper to an organization. With existing approaches, incoming calls and other types of inbound communications directed to the organization may be routed first to an agent at the call center before the caller can be connected to the party the caller is attempting to reach. Although such an approach allows for a minimal level of call screening to be performed before calls are allowed to proceed to their destination, it puts a significant strain on call-center and system resources, tying up agents and available lines of communication. It also lacks the flexibility needed to effectively process calls and other inbound communications. Accordingly, there is a need for improved systems and methods that provide efficiency and flexibility while at the same time insulating organization personnel from the unwanted communications.

The present disclosure contemplates various embodiments that may address these and other deficiencies associated with existing approaches. According to one example embodiment, a system is disclosed. The system comprises a service platform comprising an applications server, the applications server configured to communicatively couple to a softswitch and a database. The applications server is configured to receive an inbound communication and route the inbound communication to a speech-enabled intelligent script. The speech-enabled intelligent script comprises one or more of predetermined prompts and dynamically-generated prompts. The applications server is configured to determine a source of the inbound communication and a destination of the inbound communication. The applications server is configured to determine that at least one prior inbound communication directed to the destination has been received from the source of the inbound communication. The applications server is configured to receive, in response to at least one predetermined prompt or dynamically-generated prompt, a request for direct contact information associated with the destination of the inbound communication. The applications server is configured to send, to the source of the inbound communication, a message comprising the direct contact information for the destination of the inbound communication.

In certain embodiments, the applications server may be configured to send, to the destination of the inbound communication, a request for permission to route the inbound communication to the destination, the request comprising information identifying the source of the inbound communication. In certain embodiments, the applications server may be configured to receive, from the destination of the inbound communication, permission to route the inbound communication to the destination, and to route the inbound communication to the destination in response to receiving the permission. In certain embodiments, the applications server may be configured to receive, from the destination of the inbound communication, a response to the request for permission indicating that the service platform is not permitted to route the inbound communication to the destination. In response, the applications server may be configured to send contact information for the source of the inbound communication to the destination of the inbound communication and/or prompt the source of the inbound communication to leave one of a voice message or a text message for the destination.

According to another example embodiment, a method is disclosed. The method comprises receiving an inbound communication at a service platform, the service platform comprising an applications server configured to communicatively couple to a softswitch and a database. The method comprises routing the inbound communication to a speech-enabled intelligent script. The speech-enabled intelligent script comprises one or more of predetermined prompts and dynamically-generated prompts. The method comprises determining, by the service platform, a source of the inbound communication and a destination of the inbound communication. The method comprises determining, by the service platform, that at least one prior inbound communication directed to the destination has been received from the source of the inbound communication. The method comprises receiving, at the service platform in response to at least one predetermined prompt or dynamically-generated prompt, a request for direct contact information associated with the destination of the inbound communication. The method comprises sending, to the source of the inbound communication, a message comprising the direct contact information for the destination of the inbound communication.

According to another example embodiment, a non-transitory computer-readable medium is disclosed. The non-transitory computer-readable medium comprises instructions that, when executed by a processor, are configured to perform a method. The method comprises receiving an inbound communication at a service platform, the service platform comprising an applications server configured to communicatively couple to a softswitch and a database. The method comprises routing the inbound communication to a speech-enabled intelligent script. The speech-enabled intelligent script comprises one or more of predetermined prompts and dynamically-generated prompts. The method comprises determining, by the service platform, a source of the inbound communication and a destination of the inbound communication. The method comprises determining, by the service platform, that at least one prior inbound communication directed to the destination has been received from the source of the inbound communication. The method comprises receiving, at the service platform in response to at least one predetermined prompt or dynamically-generated prompt, a request for direct contact information associated with the destination of the inbound communication. The method comprises sending, to the source of the inbound communication, a message comprising the direct contact information for the destination of the inbound communication. The method comprises sending, to the destination of the inbound communication, a request for permission to route the inbound communication to the destination, the request comprising information identifying the source of the inbound communication. The method comprises receiving, at the service platform from the destination of the inbound communication, permission to route the inbound communication to the destination. The method comprises routing the inbound communication to the destination in response to receiving the permission.

According to other example embodiments, a computer program, a computer program product, and a computer readable storage medium comprising instructions which when executed on a computer perform the various embodiments described herein are disclosed.

Various embodiments contemplated by the present disclosure will now be described in more detail with reference to the accompanying drawings. Other embodiments, however, are contained within the scope of the present disclosure, and the disclosed subject matter should not be construed as limited to only the embodiments described herein. Rather, the example embodiments described herein are provided by way of example to convey the scope of the subject matter those of skill in the art.

FIG. 1 is a block diagram of an example communication system 100, in accordance with certain embodiments. More particularly, FIG. 1 illustrates communication system 100 comprising one or more callers 102a-102n, a service platform 106, and one or more operator stations 108a-108n, and one or more destinations 130. Although FIG. 1 illustrates one example of communication system 100, it should be understood that this is for purposes of example only and the present disclosure is not limited to the example communication system of FIG. 1. Rather, the present disclosure contemplates that other embodiments of system 100 may be used without departing from the scope of the present disclosure.

In the example embodiment of FIG. 1, callers 102a-102n, service platform 106, operator stations 108a-108n, and destination 130 are coupled to network 104 through communications links (as described in more detail below). As used throughout this document, the term "couple" and/or "coupled" refers to any direct or indirect communication between two or more elements, whether or not those elements are in physical contact with one another. For example, each caller 102 may use any computing and/or communication device capable of enabling the communication of information to or from one or more of service platform 106, operator stations 108, and destination 130 over network 104. Although referred to herein as a caller, it should be understood that callers 102 are not limited to individuals or devices that initiate a telephone call. Rather, the present disclosure contemplates that callers 102 may engage in a variety of types of communication sessions (e.g., telephone calls, video conferencing, text messaging, web chat, and/or any suitable form of communication). It should also be understood that a caller 102 is not necessarily limited to a party initiating a communication session. For example, in certain embodiments callers 102a-102n may be a calling party or a called party that communicates and/or receives data to and/or from service platform 106, operator stations 108, and/or destination 130. Each caller 102 may use, for example, a telephone (e.g., a wireline telephone), a wireless device (e.g., a smartphone), a Voice over Internet Protocol (IP) (VoIP) device, a desktop computer, a laptop computer, a personal digital assistant (PDA), a workstation, a mainframe computer, a mini-frame computer, a web server, or any other suitable computing and/or communicating device.

Network 104 may comprise any suitable wireless network, wireline network, or combination of wireless and wireline networks capable of supporting communication between network elements using ground-based and/or space-based components. For example, network 104 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations.

Service platform 106 receives and/or communicates data (e.g., from or to callers 102a-102n, operator stations 108a-108n, and/or destination 130) through network 104 coupled to service platform 106. In the example of FIG. 1, service platform 106 couples to network 104 through communications link 116. In certain embodiments, service platform 106 operates to collect, store, and/or communicate data to and/or from network 104. In certain embodiments, service platform 106 may be configured to integrate with, for example, telephone carriers and private branch exchange (PBX) equipment to provide a stand-alone, fully functional call center environment. In some cases, the carrier and PBX integration may be established using a Session Initiation Protocol (SIP) trunk integration method. In operation, service platform 106 may provide a full suite of call center and enterprise functionality. The various elements of service platform 106 and exemplary functionality of service platform 106 are described in more detail below.

In the example embodiment of FIG. 1, system 100 also includes a plurality of operator stations 108a through 108n. Operator stations 108a through 108n are coupled to service platform 106 through communications link 120. Operator stations 108 are capable of receiving, collecting, storing, and/or communicating data to and/or from network 104. In the example embodiment of FIG. 1, operator stations 108a through 108n are coupled to network 104 through communications links 118a and 118n, respectively.

In certain embodiments, operator stations 108a through 108n may be comprised in a call center. For example, each operator station 108 may be a live agent-based data collection system capable of collecting data from, for example, a caller 102 or destination 130. Although operator station 108 is an agent-based system in the example embodiment of FIG. 1, the present disclosure contemplates that other suitable data collection system may be used without departing from the scope of the present disclosure.

As used herein, the term agent should be interpreted broadly to encompass any individual associated with a call center that caller 102 may be connected to, whether as part of an incoming call from caller 102 routed to service platform 106 or as part of an outgoing call transmitted from service platform 106 to caller 102. As non-limiting examples, an agent may refer to an agent working in a call center (e.g., at one of operator stations 108), an employee of an organization associated with service platform 106 and/or operator stations 108, a technician (that may or may not be working remotely from a call center), or any other suitable person or entity. Although certain embodiments may describe an agent as an operator associated with an operator station 108 in a call center, the present disclosure is not limited to such an example embodiment. Rather, the various embodiments described herein may be applied to other suitable scenarios, such as those in which operator stations 108 do not make up a traditional call center (having a plurality of operator stations in one, centralized location). For example, in certain embodiments operator stations 108 may be distributed geographically and may couple to service platform 106 and callers 102 via one or more different networks.

Operator stations 108 may comprise any suitable computing and/or communicating device or combination of devices. In the example embodiment of FIG. 1, each operator station 108 includes a host 112 and a communication device 114. Communication device 114 enables an agent to communicate with caller 102. Communication device 114 may comprise, for example, a telephone, a wireless device, a voice over IP device, or any other computing and/or communicating device or combination of devices. Although the example embodiment of FIG. 1 illustrates host 112 and communication device 114 as separate devices, one device that is capable of performing the desired functionality could be used without departing from the scope of the present disclosure.

Host 112 may comprise, for example, a desktop computer, a laptop computer, a server computer, a personal digital assistant, and/or any other computing or communicating device or combination of devices. In certain embodiments, host 112 may be connected to a PBX-based automated call distribution (ACD) or the ACD of service platform 106. Host 112 may be configured to run software, such as a soft agent. The soft agent may, for example, include a SIP-based soft phone and switch-specific computer telephony integration (CTI) control of the agent state during call handling. The soft agent may provide an interface to service platform 106, and in particular to applications server 120 and softswitch server 122 of service platform 106. Host 112 may include a graphical user interface (GUI) that enables a live agent to collect, enter, process, store, retrieve, amend, and/or dispatch data during the interaction of operator station 108 with a caller 102 (e.g., during a call). Host 112 may run console software that provides, for example, IP-based call handling using the GUI and, for example, an input device (such as a mouse, keyboard, microphone, or other suitable input device).

Each host 112 may be capable of executing and/or displaying one or more intelligent scripts and/or other types of scripts that at least partially contribute to the collection of data from caller 102. As described below, an intelligent script may guide call center agents through call completion steps.

Destination 130 may be associated with a business or other entity that has engaged a call center to manage incoming and/or outgoing calls and other types of inbound and/or outbound communications. In certain embodiments, destination 130 may configure one or more configuration parameters that service platform 106 may use to process communications. In the example of FIG. 1, destination 130 is coupled to network 104 through communications link 132. Similar to caller 102 described above, destination 130 may use any computing and/or communication device capable of enabling the communication of information to or from one or more of service platform 106, operator stations 108, and callers 102 over network 104. For example, destination 130 may use a telephone (e.g., a wireline telephone), a wireless device (e.g., a smartphone), a VoIP device, a desktop computer, a laptop computer, a PDA, a workstation, a mainframe computer, a mini-frame computer, a web server, or any other computing and/or communicating device.

As described above, in the example embodiment of FIG. 1 callers 102a-102n, service platform 106, operator stations 108-108n, and destination 130 are coupled to network 104 through various communication links. More particularly, system 100 includes communications links 110, 116, 118, 120 and 132, each operable to facilitate the communication of data to and/or from network 104. Communications links 110, 116, 118, 120, and 132 may include any hardware, software, firmware, or combination thereof. In various embodiments, communications links 110, 116, 118, 120, and 132 may comprise communications media capable of assisting in the communication of analog and/or digital signals. Communications links 110, 116, 118, 120, and 132 may, for example, comprise a twisted-pair copper telephone line, a fiber optic line, a Digital Subscriber Line (DSL), a wireless link, a USB bus, a PCI bus, an ethernet interface, or any other suitable interface operable to assist in the communication of information.

Data may be transmitted over communications links 110, 116, 118, 120, and 132 using any suitable protocol. As non-limiting examples, protocols such as the Real-time Transport Protocol (RTP) and WebRTC may be used. RTP is a network protocol for delivering audio and video over IP networks via streaming. WebRTC is an open framework for the web that enables high quality real-time communication sessions over a network. WebRTC allows for the streaming of audio and/or video media without requiring an intermediary or third-party software. RTP and WebRTC may be particularly useful in the various embodiments described herein, because they can advantageously allow for the receipt of real-time data from the communication session between, for example, caller 102 and an agent associated with an operator station 108, if desired.

As described above, service platform 106 may provide a full suite of call center and enterprise functionality. Service platform 106 may comprise any suitable combination of hardware, software, and/or firmware. In certain embodiments, service platform 106 may comprise any device or combination of devices that may include one or more software and/or firmware modules. In the example embodiment of FIG. 1, service platform 106 includes an applications server 120, a softswitch server 122, a resource server 124, a database server 126, and a web server 128. Although FIG. 1 illustrates a particular arrangement of elements of service platform 106, it should be understood that the present disclosure is not limited to the precise arrangement of the example embodiment of FIG. 1. For example, although FIG. 1 illustrates an example embodiment in which applications server 120, softswitch server 122, resource server 124, database server 126, and web server 128 are incorporated into a single device, the present disclosure is not limited to this example embodiment. In certain embodiments, the elements of service platform 106 may be distributed. In certain embodiments, service platform 106 may contain fewer components than those illustrated in the example embodiment of FIG. 1. Additionally, in certain embodiments service platform 106 may contain any suitable additional components that may provide one or more of the functionalities described herein and/or additional functionality of service platform 106.

Applications server 120 may house one or more applications used by service platform 106. In certain embodiments, applications server 120 may provide a full suite of call center and enterprise applications. Exemplary call center and enterprise applications provided by applications server 120 are described in more detail below.

Softswitch server 122 is coupled to applications server 120 and resource server 124. Softswitch server 122 may house the switching components of service platform 106. For example, softswitch server 122 may include a softswitch. In certain embodiments, the softswitch may be a SIP-based telephony switch. The softswitch may receive inbound phone calls (e.g., from clients 102) and send outgoing call requests (e.g., outbound calls from operator stations 108). The softswitch may provide telephony services to, for example, IP subscribers and traditional PSTN subscribers, for example by supplying the trunking between the IP and PSTN networks. Softswitch server 122 may operate in tandem with applications server 120, resource server 124, database server 126, and web server 128 to provide voice processing and switching resources. For example, softswitch server 122 may provide one or more of intelligent call routing, switch-based configurable call control, multi-lingual voice processing resources, and other suitable functionality. In certain embodiments, softswitch 122 may stream audio to resource server 124 for processing (for example, using the speech recognition functionality of resource server 124, described in more detail below).

Resource server 124 is coupled to applications server 120 and softswitch server 122. Resource server 124 may operate in tandem with one or more of applications server 120, softswitch server 122, database server 126, and web server 128 to provide voice processing resources for service platform 106. For example, resource server 124 may provide a speech recognition engine and voice resources for service platform 106. Resource server 124 may include an automatic speech recognition (ASR) engine capable of processing voice responses, natural language processing, text-to-speech translations, and/or speech-to-text translations in connection with one or more voice-enabled functions of service platform 106. In certain embodiments, resource server 124 can be configured to use one or more customizable grammars to match spoken phrases to, for example, directory listings. Resource server 124 may be configured to receive audio from softswitch server 122 for processing using the speech-recognition functionalities described above.

Database server 126 is coupled to applications server 120. Database server 126 may store information utilized by one or more other elements of service platform 106 (such as applications server 120, softswitch server 122, resource server 124, and web server 128). For example, database server 126 may store one or more of speech-enabled intelligent scripts, intelligent scripts, scripts, prompts, information associated with a user (e.g., called or calling party), selections and data inputs from a user, and any other suitable information. In certain embodiments, database server 126 may use a structured query language (SQL) server database engine for database management, storage, and retrieval. Database server 126 may include memory capable of storing one or more scripts (e.g., speech-enabled intelligent scripts, intelligent scripts, and scripts), data associated with a user's response or responses, information related to previous interactions between a user and service platform 106 and/or a caller and an agent, and/or any other suitable information. The memory may include any hardware, software, firmware, or combination thereof operable to store and facilitate retrieval of information. The memory may store information using any of a variety of data structures, arrangements, and/or compilations. The memory may, for example, include a dynamic random access memory (DRAM), a static random access memory (SRAM), a NAND flash memory, or any other suitable volatile or nonvolatile storage and retrieval device or combination of devices.

In certain embodiments, database server 126 may store information about the source of an inbound communication and/or the destination of an inbound communication. For instance, database server 126 may store information related to one or more of the name, company, occupation, demographic information, contact information (e.g., telephone number, email address), preferred contact methods, preferred contact times, IP address, other identifying information, capability information (e.g., conferencing capabilities, messaging capabilities, types of communication available, etc.), preference information (e.g., language preferences), trusted contacts of a caller 102 (e.g., individuals that are authorized to act on behalf of a caller 102), blacklisted parties (e.g., individuals that are not authorized to act on behalf of a caller 102), and any other suitable information about the source of the inbound communication (e.g., a caller 102). Database server 126 may store analogous information for the destination of the inbound communication (e.g., destination 130, which, as described above, may be associated with an organization that has engaged the call center to manage incoming and/or outgoing calls and other types of inbound and/or outbound communications). Database server 126 may also store one or more configuration parameters associated with the destination of the inbound communication (described in more detail below). Additionally, database server 126 may store information about previous interactions that the source of the inbound communication (e.g., a caller 102) has had with service platform 106, an agent or operator, and/or with destination 130. For example, for each communication session established via service platform 106, database server 126 may store information related to one or more of: the reason for the communication; the disposition of the communication; the duration of the communication; the agent involved in the communication; context information; date and time of the communication; whether a translator was required; any problems associated with the communication; and any other suitable information.

Data stored in database server 126 may be accessible by multiple components of service platform 106 and/or operator stations 108 (including, for example, host 112 described in more detail below). For example, the data stored in database server 126 may be accessible to one or more of applications server 120, softswitch server 122, resource server 124, web server 128, and host 112. Storing data in a memory that is accessible to multiple elements of system 100 can prove advantageous when it is desired to subsequently access and process this information. In certain embodiments, data stored in database server 126 can be used to populate a speech-enabled intelligent script, an intelligent script, and/or any other type of script used by applications server 120 and/or an agent associated with an operator station 108. Populating scripts with data stored in database server 126 can help the intelligent speech-enabled scripts (or an agent using an intelligent scripts) to interact more efficiently with a caller 102. For example, populating a speech-enabled intelligent script and/or a script used by a live agent with data from database server 126 allows the intelligent speech-enabled script or the agent or operator to review the responses previously provided, which may allow the agent to better assist the a caller 102. In certain embodiments, data stored in database server 126 can be used in communications processing, as described in more detail below.

Web server 128 provides the web services for service platform 106. In certain embodiments, service platform 106 may include all or some suitable combination of the servers described above, as well as (alternatively or in addition to) other elements configured to perform desired communicating and/or computing functionality.

Each of applications server 120, softswitch server 122, resource server 124, database server 126, and web server 128 may comprise any suitable combination of hardware, software, and firmware. In certain embodiments, one or more of applications server 120, softswitch server 122, resource server 124, database server 126, and web server 128 may include processing circuitry, such as a combination of one or more of a controller, microprocessor, microcontroller, central processing unit, digital signal processor, application-specific integrated circuit, field programmable gate array, or any other suitable computing device, resource, or combination of hardware, software, and/or encoded logic operable to provide the functionality described herein. The processing circuitry may execute instructions stored in device readable medium or in memory to provide the functionality described herein. Applications server 120, softswitch server 122, resource server 124, database server 126, and web server 128 may comprise any form of volatile or non-volatile computer readable memory including, for example, persistent storage, solid-state memory, remotely mounted memory, magnetic media, optical media, random access memory (RAM), read-only memory (ROM), mass storage media (for example, a hard disk), removable storage media (e.g., a flash drive, a Compact Disk (CD) or a Digital Video Disk (DVD)), and/or any other volatile, non-transitory device readable and/or computer executable memory devices that store information, data, and/or instructions that may be used by the processing circuitry. The memory may store any suitable instructions, data or information, including a computer program, software, an application including one or more of logic, rules, code, tables, etc. and/or other instructions capable of being executed by the processing circuitry to perform the various functionalities described herein. The memory may store responses written to memory by a script, such as an intelligent script or speech-enabled intelligent script. In some cases, the processing circuitry and device readable medium may be considered to be integrated.

In certain embodiments, one or more of applications server 120, softswitch server 122, resource server 124, database server 126, and web server 128 may run on dedicated servers. In other embodiments, one or more of applications server 120, softswitch server 122, resource server 124, database server 126, and web server 128 may run in a virtual server environment. Running applications server 120, softswitch server 122, resource server 124, database server 126, and web server 128 in a virtual server deployment may advantageously reduce the number of servers needed and provide greater flexibility in terms of redundancy and ease of deployment.

As described above, applications server 120 may house one or more applications used by service platform 106 to provide a full suite of call-center and enterprise applications. For example, applications server 120 may provide for ACD, such as skills-based routing ACD. This may advantageously enable service platform 106 to provide for functionality such as priority call routing, overflow, integral voice processing, reporting, and server-based PBX integration. In certain embodiments, applications server 120 may determine how incoming and/or outgoing calls should be routed, and provide instructions to softswitch server 122 to route calls in a particular manner.

As another example, applications server 120 may provide scripting functionality (e.g., intelligent scripting and/or speech-enabled intelligent scripting functionality). An intelligent script guides users through call completion steps, work flow steps, and messaging steps. Intelligent scripts can be built for call center agents, operators, and web and mobile users. Similarly, intelligent scripts guide call center agents through call completion steps. In certain embodiments, an intelligent script presents the appropriate options for each call type an agent handles, eliminating errors and reducing training time. One exemplary use of intelligent scripts is healthcare code calls. Call scripts guide agents through the specific requirements for code calls, eliminating errors, ensuring the codes are completed quickly, and self-documenting all steps taken to complete each code call.

Intelligent scripts may contain any number of elements, actions, and screens. In certain embodiments, a script designer enables an administrator (e.g., a call center administrator) to create any number of intelligent scripts. In certain embodiments, destination 130 may be able to use a scripting engine to generate any number of intelligent scrips in a similar manner. Each script may have a unique flow to present the elements, actions, and screens in the preferred order for each scenario. Branching and decision trees may be available within the scripts to customize the flow of elements based on selections, date/time, or data. In one particular non-limiting example, a script can comprise a series of queries requesting information and/or data from a user (e.g., a caller) of service platform 106. In some cases, intelligent scripts may include, for example, an HTML-based script, an XML-based script, a JSON-based script, or a combination of these or other scripting formats. Intelligent scripts may comprise, for example, software, firmware, code, portions of code, data compilations, and/or a combination of these or any other type of data.

Speech-enabled intelligent scripts enable users (e.g., a caller 102) to interact with intelligent scripts without agent involvement. Phone users are guided through scripts using pre-recorded prompts, voice menus, and text-to-speech menus. Phone users make selections and input data (e.g., using Dual Tone-Multi Frequency (DTMF) entry or speech recognition entry). In certain embodiments, the entire intelligent script may be speech-enabled. In certain embodiments, the script designer (e.g., a call center administrator or destination 130) may enable the administrator to choose which entries are to be speech-enabled. In certain embodiments, the speech-enabled intelligent script (or a section thereof) may include prompts and/or questions similar to those in the intelligent script provided to the agent. In certain embodiments, the elements and/or actions of the speech-enabled intelligent script may be the same as the intelligent script provided to the agent. In some cases, the script prompts and/or questions may be pre-configured. In other cases, the script prompts and/or questions may change dynamically based on previous call interactions and/or other data stored in database server 126. Speech-enabling intelligent scripts may advantageously create an opportunity to have a single script that presents speech-enabled input for a portion of the script, and screen-enabled input for another portion of the script.

Applications server 120 may provide various voice services (alone or in combination with, for example, one or more of softswitch server 122 and resource server 124). For instance, applications server 120 may provide call center functions such as playing greetings to callers with multi-level navigation menus, playing automated call queuing announcements, playing automated agent greetings, automated call recording and playback, and other suitable functions. In certain embodiments, applications server 120 may provide for automated outbound phone calls (e.g., calls to one or more of clients 102) with messages played using integrated text-to-speech.

Other examples of services that service platform 106 provides may include (but are not limited to): call routing; call monitoring; database driven scripted messages (including intelligent speech-enabled scripts described above); call recording; directory services; status, event, on-call, and workforce scheduling tools; and event-driven statistical and analytical reporting for console operators as well as enterprise web users.

In certain embodiments, applications server 120 may be configured to provide communications processing functionality that is more efficient and flexible than existing approaches, while at the same time insulating called parties (e.g., destination 130) from unwanted communications (e.g., robocalls, unsolicited sales calls, or inbound communications that destination 130 does not wish to receive). For instance, in certain embodiments a caller 102 (e.g., caller 102a) may initiate a communication using a computing and/or communication device. Any suitable method of communication may be used. For example, the inbound communication may be a phone call, a video conference call, a text message, an e-mail, a web chat, or any other suitable type of communication. In the example embodiment of FIG. 1, the communication is destined for destination 130, which may be associated with an organization that has engaged a call center employing service platform 106 to process inbound communications. For example, in the case of a telephone call, the called number may be associated with the call center responsible for processing inbound communications to the organization. The communication is routed (e.g., via network 104 in the example embodiment of FIG. 1) to service platform 106.

Applications server 120 is configured to receive the inbound communication (e.g., directly or via softswitch server 122). Applications server 120 is configured to route the inbound communication to a speech-enabled intelligent script. As described above, the speech-enabled intelligent script may comprise one or more of predetermined prompts and dynamically-generated prompts.

Applications server 120 is configured to determine a source of the inbound communication and a destination of the inbound communication. Applications server 120 may be configured to determine the source and destination of the inbound communication in any suitable manner. As one example, applications server 120 may determine the source and destination of the inbound communication based on caller 102a's responses to the various prompts provided by the speech-enabled intelligent script. Such an approach may be particularly appropriate if it is the first time that caller 102a has attempted to reach destination 130.

As another example, if the inbound communication is a telephone call or a text message, applications server 120 may be configured to use automatic number identification (ANI) to determine the telephone number of the calling/texting party. Applications server 120 may use this information to determine the source of the inbound communication. For instance, applications server 120 may use the determined telephone number to query database server 126. As described above, database server 126 may store information associated with caller 102a. In response to the query from applications server 120, database server 126 may return information associated with the telephone number used for the query, including information about the source of the inbound communication (in this example, caller 102a). For example, database server 126 may provide information about the calling/texting party's name, business, relationship to destination 130, or any other suitable information.

For other types of inbound communications, applications server 120 may use a similar process to determine the source of the inbound communication. For instance, depending on the type of inbound communication, applications server 120 may determine identifying information for the source of the communication (e.g., an IP address, e-mail address, or other identifying information of the source of the inbound communication). Applications server 120 may use the obtained information to query database server 126 and obtain information regarding the source of the communication (e.g., caller 102a) as described above.

Applications server 120 may determine the destination of the inbound communication in an analogous manner. For example, if the inbound communication is a telephone call or a text message, applications server 120 may be configured to determine the telephone number of the called/texted party. For other types of inbound communications, applications server 120 may determine identifying information for the destination of the inbound communication (e.g., an IP address, e-mail address, or other identifying information of the destination of the inbound communication). Applications server 120 may use this information to determine the destination of the inbound communication. For instance, applications server 120 may use the determined telephone number or other identifying information to query database server 126. As described above, database server 126 may store information associated with destination 130. In response to the query from applications server 120, database server 126 may return information associated with the telephone number or other identifying information used for the query, including information about the destination of the inbound communication (in this example, destination 130). For example, database server 126 may provide information about the called/texted party's name, business, relationship to caller 130, or any other suitable information.

Applications server 120 is configured to determine that at least one prior inbound communication directed to destination 130 has been received from the source of the inbound communication (e.g., caller 102a in the present example). As described above, database server 126 may store information related to previous interactions of caller 102a with service platform 106, operator stations 108, and/or destination 130. In certain embodiments, database server 126 may store information indicating whether there have been any prior inbound communications directed to destination 130 that were received from caller 102a. Applications server 120 may be configured to query database server 126 to obtain this information. In certain embodiments, applications server 120 may be configured to obtain the information related to prior inbound communications to destination 130 from caller 102a at the time that it determines the source and destination of the inbound communication as described above. In certain embodiments, applications server 120 may be configured to perform a separate database query (e.g., using the identifying information of caller 102a and/or destination 130) to determine whether at least one prior inbound communication directed to destination 130 has been received from the source of the inbound communication (e.g., caller 102a).

Applications server 120 is configured to receive, in response to at least one predetermined prompt or dynamically-generated prompt, a request for direct contact information associated with the destination of the inbound communication (e.g., destination 130). As described above, applications server 120 is configured to route the inbound communication to a speech-enabled intelligent script, which may be hosted by applications server 120. The speech-enabled intelligent script enables caller 102a to interact with intelligent scripts without agent involvement using, for example, pre-recorded prompts, voice menus, text-to-speech menus, and dynamically-generated prompts (e.g., prompts and/or questions that may change dynamically based on previous call interactions and/or other data stored in database server 126).

In certain embodiments, in response to determining that at least one prior inbound communication directed to destination 130 has been received from caller 102a (the source of the inbound communication in the present example), applications server 120 may be configured to cause the speech-enabled intelligent script to which the inbound communication was routed to present a predetermined or dynamically-generated prompt asking caller 102a whether caller 102a would like to receive direct contact information for destination 130. In some cases, the predetermined prompt or dynamically-generated prompt may be an audio recording indicating that direct contact information associated with the destination of the inbound communication can be requested. For instance, one example of a predetermined prompt may be an announcement that asks "Would you like to receive direct contact information for the party you are attempting to reach?" An example of a dynamically-generated prompt may be an audio recording that is dynamically generated (e.g., using text-to-speech functionality) based on the information obtained from database server 126 described above (e.g., information related to the source and/or destination of the inbound communication). For example, if applications server 120 determines that caller 102a is Ms. Smith, and destination 130 is Ms. Johns, the dynamically generated prompt may be an announcement that asks "Ms. Smith, would you like to receive direct contact information for Ms. Johns for future reference?"

In certain embodiments, the request for direct contact information associated with destination 130 may be in the form of speech input from caller 102a. For example, caller 102a may request direct contact information by responding to the at least one prompt by speaking the word "Yes." In certain embodiments, the request for direct contact information associated with destination 130 may be a keypad selection. For example, caller 102a may request direct contact information for destination 130 by responding to the at least one prompt by pressing the number "1" on a telephone keypad (or by providing other suitable input).

As described above, in certain embodiments the inbound communication may be a text message. In such a scenario, the at least one predetermined prompt or dynamically-generated prompt may be presented in a textual format. For instance, instead of an audio recording, a text message may be sent to caller 102 that asks "Would you like to receive direct contact information for the party you are attempting to reach?" (or an analogous dynamically-generated prompt). In such a scenario, the request for direct contact information associated with the destination of the inbound communication may be textual input. As one example, caller 102 may respond "Yes" to request direct contact information.

Applications server 120 is configured to send, to caller 102a (the source of the inbound communication), a message comprising the direct contact information for destination 130 (the destination of the inbound communication). In certain embodiments, applications server 120 may be configured to send the direct contact information for destination 130 to caller 102a in response to receiving the request for direct contact information from caller 102a. The direct contact information for destination 130 may be sent to caller 102a in any suitable manner. For example, the message comprising the direct contact information for destination 130 may be sent to caller 102a via text message, email, fax, a prerecorded voice message, or any other suitable manner. The direct contact information may be any suitable information that enables caller 102a to communicate with destination 130 directly (e.g., without agent involvement). For instance, the direct contact information may be a direct telephone number at which destination 130 may be reached (e.g., via a phone call or a text message). As another example, the direct contact information may be an email address for destination 130. In certain embodiments, applications server 120 may be configured to query database server 126 to obtain the direct contact information for destination 130. In certain embodiments, the query to database server 126 may include identifying information that database server 126 can use to access a record containing information related to destination 130.

In certain embodiments, applications server 120 may be configured to route the inbound communication to destination 130 (e.g., after receiving the request for direct contact information for destination 130 from caller 102a).

In some cases, however, it may be desirable to perform additional screening steps before routing the inbound communication to destination 130. In certain embodiments, applications server 120 may be configured to send, to destination 130, a request for permission to route the inbound communication to destination 130. The request may comprise information identifying the source of the inbound communication (e.g., caller 102a). The request for permission may be sent in one or more of a variety of formats, which may vary according to implementation. For example, in certain embodiments the notification may be a push notification from an app associated with the call center (e.g., a secure messaging app), an email, a text message, an outgoing call that presents a voice prompt when answered that requests permission, a paging message, or other suitable means. In some cases, more than one type of notification may be used (e.g., an email and a text message may be sent).

As described above, the request for permission may identify the source of the inbound communication (e.g., caller 102a). The request for permission may identify the source of the inbound communication in any suitable manner. In certain embodiments, the request for permission may include information associated with caller 102a obtained from database server 126. For instance, the request for permission may include one or more of the name, business, and title of caller 102a, and/or any other suitable identifying information for caller 102a. In certain embodiments, the request for permission may include other information obtained from database server 126. For example, the request for permission may include information about previous interactions with caller 102a (e.g., the reason that caller 102a previously interacted with service platform 106 and/or destination 130 and information about the disposition of the previous interaction).

In certain embodiments, the request for permission enables destination 130 to indicate whether or not the inbound communication may be routed to destination 130. For example, the request for permission may include a link (e.g., a uniform resource locator (URL)) or button enabling destination 130 to respond to the request for permission. In certain embodiments, destination 130 may indicate permission to route the inbound communication to destination 130 by selecting the link or button (or providing another suitable input). In response to the input from destination 130, a response to the request for permission may be sent to applications server 120 indicating that the inbound communication may be routed to destination 130. In certain embodiments, a lack of response from destination 130 may be treated by applications server 120 as a response to the request for permission indicating that the inbound communication may not be routed to destination 130. In certain embodiments, the request for permission may include two links or buttons, one for indicating permission to route the inbound communication to destination 130 (e.g., a button that says "Yes") and one for indicating that the inbound communication is not permitted to be routed to destination 130 (e.g., a button that says "No"). In such a scenario, in response to input from destination 130 (e.g., selecting the button that says "No"), a response to the request for permission may be sent to applications server 120 indicating that the inbound communication may not be routed to destination 130.

In some cases, destination 130 may give permission to route the inbound communication to destination 130. Accordingly, applications server 120 may be configured to receive, from destination 130, permission to route the inbound communication to the destination. In such a scenario, applications server 120 may be configured to route the inbound communication to destination 130 in response to receiving the permission.

In some cases, however, destination 130 may not give permission to route the inbound communication to destination 130. For example, destination 130 may be unable to take a call or respond to a text message and therefore withhold permission to route the inbound communication. In such a scenario, applications server 120 may be configured to receive, from destination 130, a response to the request for permission indicating that applications server 120 is not permitted to route the inbound communication to destination 130. In such a scenario, applications server 120 may perform one or more additional call processing steps.

In certain embodiments, applications server 120 may be configured to, in response to receiving the response to the request for permission indicating that applications server 120 is not permitted to route the inbound communication to destination 130, send contact information for the source of the inbound communication (e.g., caller 102*a*) to destination 130. This may advantageously enable destination 130 to contact caller 102*a* at a time that is convenient for destination 130.

Additionally or alternatively, applications server 120 may be configured to, in response to receiving the response to the request for permission indicating that applications server 120 is not permitted to route the inbound communication to destination 130, prompt caller 102*a* (the source of the inbound communication) to leave one of more of a voice message or a text message for destination 130. Similar to the prompt discussed above with respect to the request to receive direct contact information for destination 130, the prompt may be prerecorded or dynamically generated. An example of a prerecorded prompt may be an audio announcement (in cases where the inbound communication is a phone call) or a text message (in cases where the inbound communication is a text message) that states: "The party you are trying to reach is currently unavailable. Would you like to leave a message?" An example of a dynamically generated prompt may be an audio announcement (in cases where the inbound communication is a phone call) or a text message (in cases where the inbound communication is a text) that states: "We're sorry Ms. Smith, but Ms. Johns is not available right now. Would you like to leave a message?" Caller 102*a* may respond to the prompt in a manner similar to that described above (e.g., by speaking or texting "Yes" to leave a message or "No" to not leave a message, or by selecting an appropriate key on a keypad, such as pressing "1" for "Yes" or "2" for "No"). Applications server 120 may be configured to obtain the voice message or the text message from caller 102*a*, and send the obtained voice or text message to the destination of the inbound communication.

In certain embodiments, applications server 120 is configured to receive a subsequent inbound communication from the source (e.g., caller 102*a* in the present example). The subsequent inbound communication may utilize the direct contact information for destination 130 previously provided to caller 102*a*. For example, the subsequent inbound communication may be directed to the direct telephone number for destination 130 (as opposed to the telephone number more generally associated with the organization employing the call center utilizing service platform 106). In such a scenario, the subsequent inbound communication may still be routed to service platform 106. However, rather than routing the communication to the speech-enabled intelligent script as described above, applications server 120 may be configured to route the subsequent inbound communication directly to destination 130. In certain embodiments, applications server 120 may be configured to request permission from destination 130 as described above before routing the subsequent inbound communication directly to the destination.

In certain embodiments, applications server 120 may be configured to monitor for changes to the direct contact information of destination 130. If the direct contact information for destination 130 changes, applications server 120 may be configured to inform caller 102*a* of the change. For instance, after previously providing caller 102*a* with direct contact information for destination 130, applications server 120 may determine that the direct contact information for destination 130 has changed. Applications server 120 may be configured to, in response to receiving a subsequent inbound communication from caller 102*a* directed to the old direct contact (e.g., telephone number) for destination 130, determine that caller 102*a* has previously contacted destination 130. Applications server 120 may be configured to determine that the direct contact information for destination 130 has changed and to prompt caller 102*a* regarding whether caller 102*a* would like to receive updated direct contact information for destination 130 in a similar manner to that described above. Applications server 120 may then process the subsequent inbound communication in a manner consistent with that described above.

In certain embodiments, applications server 120 may be configured to identify one or more configuration parameters associated with destination 130 to determine the appropriate call processing steps for an inbound communication. The one or more configuration parameters may be any suitable information that applications server 120 may use to process an inbound communication. For example, the one or more configuration parameters may indicate that applications server 120 should request permission from destination 130 before routing subsequent inbound communications directed to destination 130 to destination 130. As another example, the one or more configuration parameters may specify conditions that must be met before applications server 120 sends direct contact information for destination 130 to a caller 102. For instance, the one or more configuration parameters may indicate that direct contact information for destination 130 may only be given out to an identified set of trusted contacts associated with destination 130.

In certain embodiments, the one or more configuration parameters may be configured by destination 130. This may be particularly advantageous because it enables communications to be processed in accordance with the particular needs of destination 130. In certain embodiments, a default set of one or more configuration parameters may be used.

The present disclosure contemplates that other types of configuration parameters may be used in addition to or as alternatives to the examples described above. For example, the one or more configuration parameters may indicate how various types of inbound communications should be processed when they are received at service platform 106. As another example, the one or more configuration parameters may indicate how inbound communications received at a particular time of day (e.g., mornings, afternoons, evenings, weekends) should be processed. In some cases, the one or more configuration parameters may be more granular (e.g., indicating specific communication processing steps for inbound communications received within a specific window of time on a given day, such as between 2:00 μm and 4:00 pm every other Thursday). As still another example, the one or more configuration parameters may indicate that calls from a particular source (e.g., caller 102a, which may be a prospective customer) should always be routed directly to destination 130 rather than an agent or speech-enabled intelligent script. As yet another example, the one or more configuration parameters may indicate particular time periods during which no inbound communications should be routed directly to destination 130. As another example, the one or more configuration parameters may indicate that applications server 120 should use predictive intelligence to determine whether or not to provide direct contact information for destination 130 to a particular source (e.g., a particular caller 102).

In certain embodiments, applications server 120 may determine whether to provide direct contact information, route subsequent inbound communications directly to destination 130, and/or perform other communication processing steps using predictive intelligence. In some cases, whether or not applications server 120 should use predictive intelligence may be indicated by one of the one or more configuration parameters described above. As described above, database server 126 may be configured to store information about previous interactions between caller 102a and destination 130 and/or destination 130 and other callers 102. Applications server 120 may be configured to use the information about previous interactions (alone or in combination with other information, such as preference information) to self-learn and adjust as calls are processed. Applications server 120 employing predictive intelligence functionality may be configured to use one or more of the various information sources described above to predict a preferred behavior for subsequent calls.

To illustrate the operation of the above-described functionality, consider the following non-limiting example. Assume that a hospital has engaged a call center employing service platform 106 to process inbound communications directed to the hospital. In this example, destination 130 is a patient in the hospital and caller 102n is a family member of a patient at the hospital. Accordingly, the family member (caller 102n) may need to frequently contact the patient (destination 130) (e.g., to inquire about the patient's health, discuss treatment options, and plan a visit). The first time the family member attempts to contact the patient, the family member uses the hospital's general telephone number. The first call is received at applications server 120. Applications server 120 routes the first call to a speech-enabled intelligent script. Applications server 120 determines the source (i.e., the family member) and the destination (i.e., the patient). This information may be determined based on a database query and/or based on the family member's responses to the various prompts provided by the speech-enabled intelligent script. Applications server 120 may determine that this is the first time the family member has placed a call to destination 130. Applications server 120 may request permission from the patient to route the call from the family member to the patient. If the patient gives permission to route the call to the patient, applications server 120 may then route the call to the patient. If the patient does not give permission to route the call to the patient, applications server 120 may send contact information for the family member to the patient and/or prompt the family member to leave a voice or text message, obtain the voice or text message, and send the obtained message to the patient.

Subsequently, the family member may attempt to contact the patient a second time. For the second call, the family member may again use the hospital's general telephone number (as the family member does not yet have direct contact information for the patient). The second call is received at applications server 120. Applications server 120 routes the second call to the speech-enabled intelligent script. Applications server 120 determines the source (i.e., the family member) and the destination (i.e., the patient) of the call. This information may be determined based on a database query and/or based on the family member's responses to the various prompts provided by the speech-enabled intelligent script. Applications server 120 determines that at least one prior call directed to the patient has been received from the family member. As described above, applications server 120 may query database server 126 to obtain information related to previous interactions between the family member and the patient. In response to determining that at least one prior call directed to the patient has been received from the family member, applications server 120 may cause the speech-enabled intelligent script to present a predetermined or dynamically-generated prompt asking the family member whether he or she would like to receive direct contact information for the patient. In response to a request for direct contact information from the family member (e.g., a speech or keypad input), applications server 120 sends direct contact information for the patient to the family member. In some cases, applications server 120 may request permission from the patient to route the second communication to the patient as described above. In some cases, applications server 120 may route the second call directly to the patient (e.g., if the information stored in database server 126 indicates that the family member is a trusted contact of the patient and the one or more configuration parameters associated with the patient indicate that calls from trusted contacts can be routed to the patient without first obtaining permission).

Subsequently, the family member may attempt to contact the patient a third time. For the third call, the family member uses the direct contact information for the patient obtained as described above. The third call is received at applications server 120. Rather than routing the communication to the speech-enabled intelligent script as described above in relation to the first and second calls, applications server 120 routes the third call directly to the patient. In some cases, applications server 120 may request permission from the patient before routing the call (e.g., based on the one or more configuration parameters associated with the patient). Subsequent calls from the family member may be handled similarly. If the direct contact information for the patient changes (e.g., because the patient has switched rooms or has been moved to a different facility), applications server 120 may determine that this change has occurred and prompt the family member regarding obtaining updated direct contact information for the patient as described above.

The various embodiments described herein may advantageously improve communications processing. For example, using configuration parameters as described above may advantageously provide for flexible communications processing. Allowing subsequent calls to be routed directly to the destination, bypassing agent involvement or the use of speech-enabled intelligent scripts, may advantageously reduce the amount of call-center and system resources required to process calls and enable inbound communications to reach their destination more quickly. Moreover, by requesting permission from the destination before routing calls, certain embodiments may advantageously provide for effective call screening without burdening system resources.

It should be appreciated that although certain functions of applications server 120 have been described above, these functions are described for purposes of example only. The present disclosure is not limited to the example embodiments described herein. In practice, applications server 120 may provide only a subset of the above-described functions, and in some cases applications server 120 may provide other suitable functionality for service platform 106.

Although certain exemplary embodiments have been described above in the context of handling an incoming telephone call, it should be understood that the present disclosure is not limited to these example embodiments. Rather, the present disclosure contemplates that the various embodiments described herein may be applied to other forms of communication including, but not limited to, text messaging, web chat, video conferencing, and any other suitable mode of communication. For example, the various embodiments described herein may be applied to multimedia communications. According to one example embodiment, a communication session may be established over a network, such as network 104, capable of delivering real-time audio and/or video media over IP networks using, for example, RTP and/or WebRTC. According to another example embodiment, a caller 102 may establish a communication session with an agent (e.g., an agent associated with a host 112 described above) using one of the above-described exemplary forms of multimedia communication or another suitable form of communication. For instance, in certain embodiments caller 102a may visit a web site associated with a company utilizing a call center including service platform 106 described above. In some cases, the web site may include a "Contact Us" button or other suitable mechanism to enable the user to initiate a communication session with an agent (e.g., via one of the forms of multimedia communication described above). As an alternative, the web site may include an automated prompt presented to the user to enable the user to establish a communication session with the agent (e.g., a chat, text, or video conversation). In these scenarios, applications server 120 may be configured to determine the source of the inbound communication using any suitable information, including, for example, an IP address, uniform resource locator (URL). Regardless of type, it should be understood that the inbound communication may be processed in accordance with the principles of the various embodiments described herein.

Additionally, although certain exemplary embodiments have been described in the context of inbound communications, the present disclosure is not limited to these example embodiments. Rather, the present disclosure contemplates that the principles of the various embodiments described herein may be applied to outgoing communications (e.g., telephone calls, text message, or web chats) initiated at the call center and directed to a caller 102.

Figure 2A:
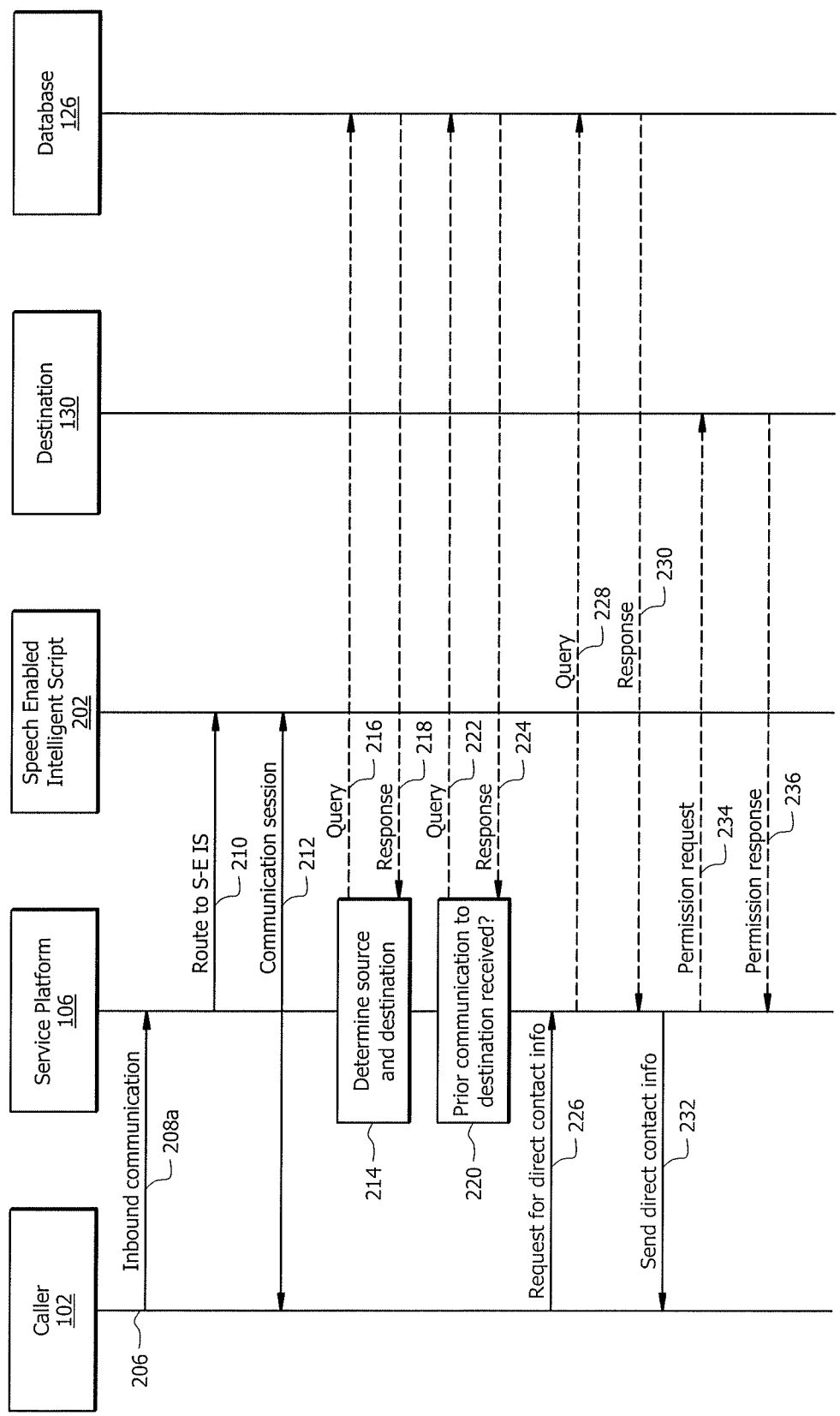
FIGS. 2A, 2B, and 2C illustrate a signal flow diagram of an exemplary technique for communications processing, in accordance with certain embodiments.
Figure 2B:
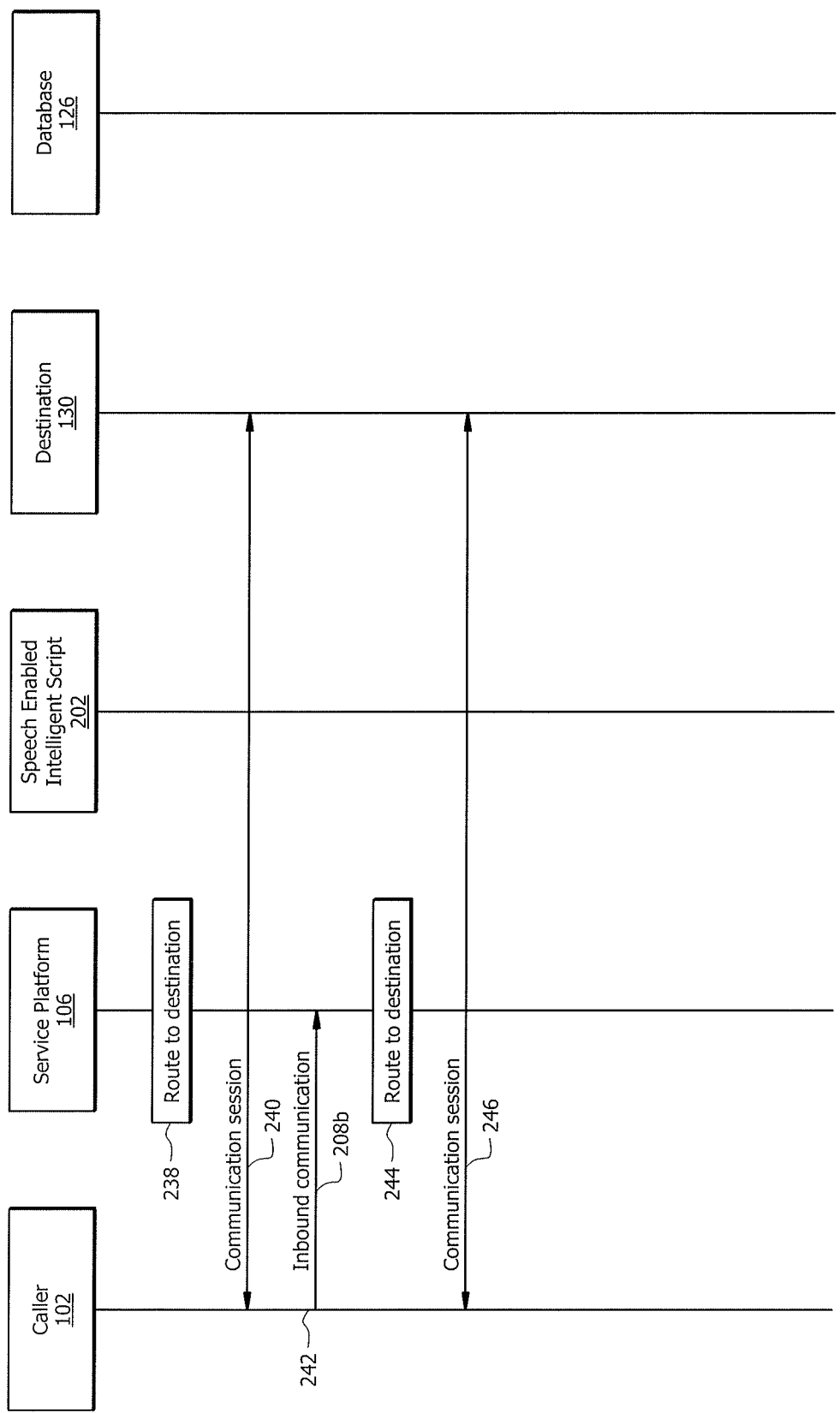
Figure 2C:
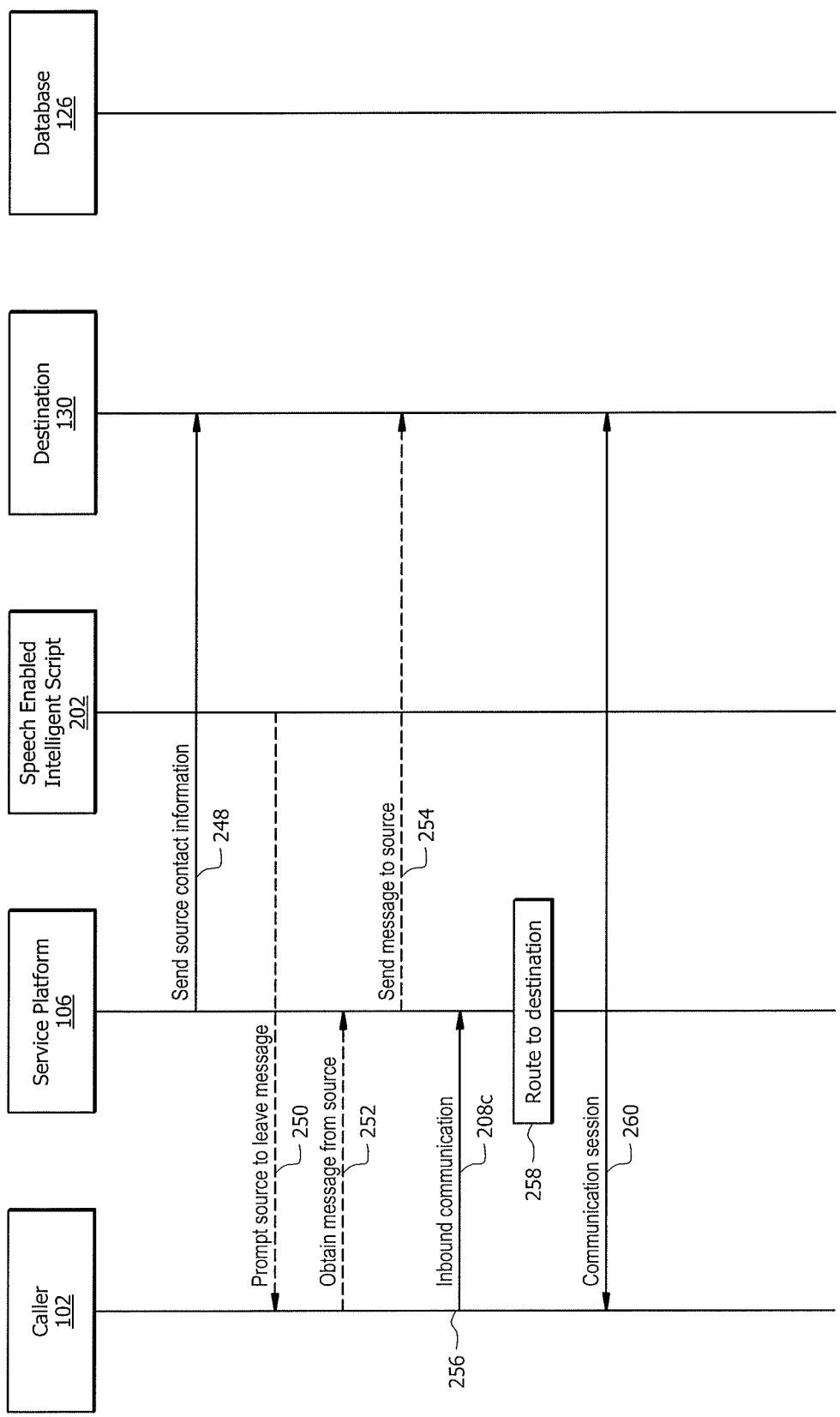

FIGS. 2A, 2B, and 2C illustrate a signal flow diagram of an exemplary technique for communications processing, in accordance with certain embodiments. In particular, FIG. 2 illustrates an exchange of signals among caller 102, service platform 106, speech-enabled intelligent script 202, destination 130 and database server 126. In certain embodiments, one or more of the steps described as performed by service platform 106 may be performed by an applications server (such as applications server 120 described above in relation to FIG. 1). Although speech-enabled intelligent script 202 is illustrated separately in the signal flow diagram of FIGS. 2A-2C, this is for purposes of explanation only and is not intended to limit the scope of the present disclosure. As described above in relation to FIG. 1, speech-enabled intelligent script functionality may be provided by an applications server of service platform 106 (e.g., applications server 120 described above in relation to FIG. 1). Similarly, although database server 126 is illustrated separately in the signal flow diagram of FIGS. 2A-2C, this is for purposes of explanation only and is not intended to limit the scope of the present disclosure. Rather, as described above in relation to FIG. 1, database server 126 may, in certain embodiments, be incorporated in service platform 106 or be hosted remotely.

At step 206, inbound communication 208a is received at service platform 106 from caller 102. In certain embodiments, inbound communication 208 may be a call or a text message.

At step 210, service platform 106 routes inbound communication 208a to speech-enabled intelligent script 202, thereby establishing communication session 212 between caller 102 and speech-enabled intelligent script 202. As described above in relation to FIG. 1, speech-enabled intelligent script 202 comprises one or more of predetermined prompts and dynamically-generated prompts.

At step 214, service platform 106 determines a source of inbound communication 208a and a destination of inbound communication 208a. As described above in relation to FIG. 1, service platform 106 may determine the source and destination of inbound communication 208a in a variety of ways. In the example embodiment of FIGS. 2A-2C, service platform 106 queries database server 126 to determine the source and destination of inbound communication 208a. In particular, service platform 106 may send a query to database server 126 at step 216. As described above in relation to FIG. 1, database server 126 may store information related to the source and destination of inbound communication 208a. The query sent to database server 126 by service platform 106 may include information that can be used by database server 126 to retrieve information about the source and destination of inbound communication 208a. For instance, if the inbound communication is a telephone call or a text message, the query may include the telephone number of caller 102, which may be determined by service platform 106 using ANI as described above in relation to FIG. 1. Database server 126 may use the telephone number of caller 102 (or other suitable information included in the query, such as information obtained from caller 102's responses to the various prompts provided by speech-enabled intelligent script 202) to access a record containing information related to the source of inbound communication 208a (e.g., caller 102). Similarly, the query may also include the telephone number to which inbound communication 208a is directed. Database server 126 may use the telephone number to which inbound communication 208a is directed (or other suitable identifying information) to access a record containing information related to the destination of inbound communication 208a (e.g., destination 130). At step 218, database server 126 responds to the query, providing the information related to the source and destination of inbound communication 208a.

At step 220, service platform 106 determines that at least one prior inbound communication directed to destination 130 has been received from the source of inbound communication 208a (e.g., caller 102). In certain embodiments, service platform 106 may query database server 126 in order to determine whether at least one prior inbound communication directed to destination 130 has been received from the source of inbound communication 208a. As described above in relation to FIG. 1, database server 126 may store information about previous interactions between caller 102 and service platform 106. The information stored in database server 126 may include information related to previous attempts by caller 102 to contact destination 130 (e.g., number of previous contact attempts, disposition of previous contact attempts, etc.). Thus, in certain embodiments service platform 106 may, at step 222, send a query to database server 126 to obtain information related to previous attempts by caller 102 to contact destination 130. The query at step 222 may include identifying information for caller 102 and/or destination 130 that database server 126 may use to access records associated with each respective party. Database server 126 accesses the associated records and returns the requested information to service platform 220 at step 224.

Although the example of FIG. 2A illustrates separate queries and responses for determining the source and destination of inbound communication 208a and determining whether a prior communication from caller 102 to destination 130 has been received, this is for purposes of example only. The present disclosure is not limited to the example embodiment illustrated in FIG. 2A. Rather, the present disclosure contemplates that other approaches may be used. For instance, in certain embodiments service platform 106 may send a single query to database server 126 to obtain information related to the source and destination of inbound communication 208a and previous contact attempts. Database server 126 may provide the requested information in a single response. Such an approach may advantageously minimize the amount of signaling required between service platform 106 and database server 126.

At step 226, service platform 106 receives, in response to at least one predetermined prompt or dynamically-generated prompt (e.g., a prompt provided by speech-enabled intelligent script 202 during communication session 212), a request for direct contact information associated with the destination of inbound communication 208a. As described above in relation to FIG. 1, in certain embodiments the at least one predetermined prompt or dynamically-generated prompt may be an audio recording indicating that direct contact information associated with the destination of the inbound communication can be requested. For instance, one example of a predetermined prompt may be an announcement that asks "Would you like to receive direct contact information for the party you are attempting to reach?" A dynamically-generated prompt may be an audio recording that is dynamically generated (e.g., using text-to-speech functionality) based on the information obtained from database server 126. For example, if the service platform determines that caller 102 is Ms. Smith, and destination 130 is Ms. Johns, the dynamically generated prompt may be an announcement that asks "Ms. Smith, would you like to receive direct contact information Ms. Johns for future reference?" In certain embodiments, the request for direct contact information associated with the destination of the inbound communication may comprise one of: speech input; and a keypad selection. As one example of speech input, caller 102 may request direct contact information by responding to the at least one prompt by speaking the word "Yes." As an example of keypad selection, caller 102 may request direct contact information by responding to the at least one prompt by pressing the number "1" on a telephone keypad (or by providing other suitable input).

As described above, in certain embodiments inbound communication 208 may be a text message. In such a scenario, the at least one predetermined prompt or dynamically-generated prompt may be presented in a textual format. For instance, instead of an audio recording, a text message may be sent to caller 102 that asks "Would you like to receive direct contact information for the party you are attempting to reach?" (or an analogous dynamically-generated prompt). In such a scenario, the request for direct contact information associated with the destination of the inbound communication may be textual input. As one example, caller 102 may respond "Yes" to request direct contact information.

At step 232, service platform 106 sends, to the source of the inbound communication (e.g., caller 102), a message comprising the direct contact information for the destination of inbound communication 208a (e.g., destination 130). The message may be sent in any suitable format. For instance, the message comprising the direct contact information may be sent to caller 102 via text message. As another example, the message comprising the direct contact information may be sent to caller 102 via email. In certain embodiments, service platform 106 may query database server 126 at step 228 to obtain the direct contact information for destination 130. As described above, the query to database server 126 may include identifying information that database server 126 can use to access a record containing information related to destination 130. At step 230, database server 126 sends a response to service platform 106 including the requested information.

In certain embodiments, service platform 106 then routes inbound communication 208a to destination 130. In the example embodiments of FIGS. 2A-2C, however, at step 234 service platform 106 sends, to destination 130, a request for permission to route inbound communication 208a to destination 130. In certain embodiments, the request for permission comprises information identifying the source of inbound communication 208a (e.g., caller 102). At step 236, destination 130 responds to the request for permission (e.g., as described above in relation to FIG. 1).

If the response from destination 130 at step 236 gives permission to route inbound communication 208a to destination 130, the signal flow progresses as shown in FIG. 2B. In FIG. 2B, at step 238, service platform 106 routes inbound communication 208a to destination 130, thereby establishing communication session 240. At step 242, service platform 106 receives a subsequent inbound communication 208b from the source directed to destination 130. In this instance, subsequent inbound communication 208b is directed to the direct contact number of destination 130. At step 244, service platform 106 routes inbound communication 208b directly to destination 130, thereby establishing communication session 246.

If the response from destination 130 at step 236 indicates that service platform 106 is not permitted to route inbound communication 208a to destination 130, the signal flow progresses as shown in FIG. 2C. In FIG. 2C, in response to receiving the response to the request for permission indicating that service platform 106 is not permitted to route inbound communication 208a to destination 130, service platform 106 sends contact information for the source of inbound communication 208a (e.g., caller 102) to destination 130. The contact information may be sent in any suitable manner. For instance, the contact information may be sent via text message to destination 130. As another example, the contact information may be sent to destination 130 via email.

In certain embodiments, at step 250, service platform 106 prompts the source of inbound communication 208a (e.g., caller 102) to leave one of a voice message or a text message for destination 130. At step 252, service platform 106 obtains the voice message or the text message from the source of inbound communication 208a. At step 254, service platform 106 sends the obtained voice message or text message to destination 130.

At step 256 of FIG. 2C, service platform 106 receives a subsequent inbound communication 208c from the source (caller 102) directed to destination 130. In this instance, subsequent inbound communication 208b is directed to the direct contact number of destination 130. At step 258, service platform 106 routes inbound communication 208c directly to destination 130, thereby establishing communication session 260.

Figure 3:
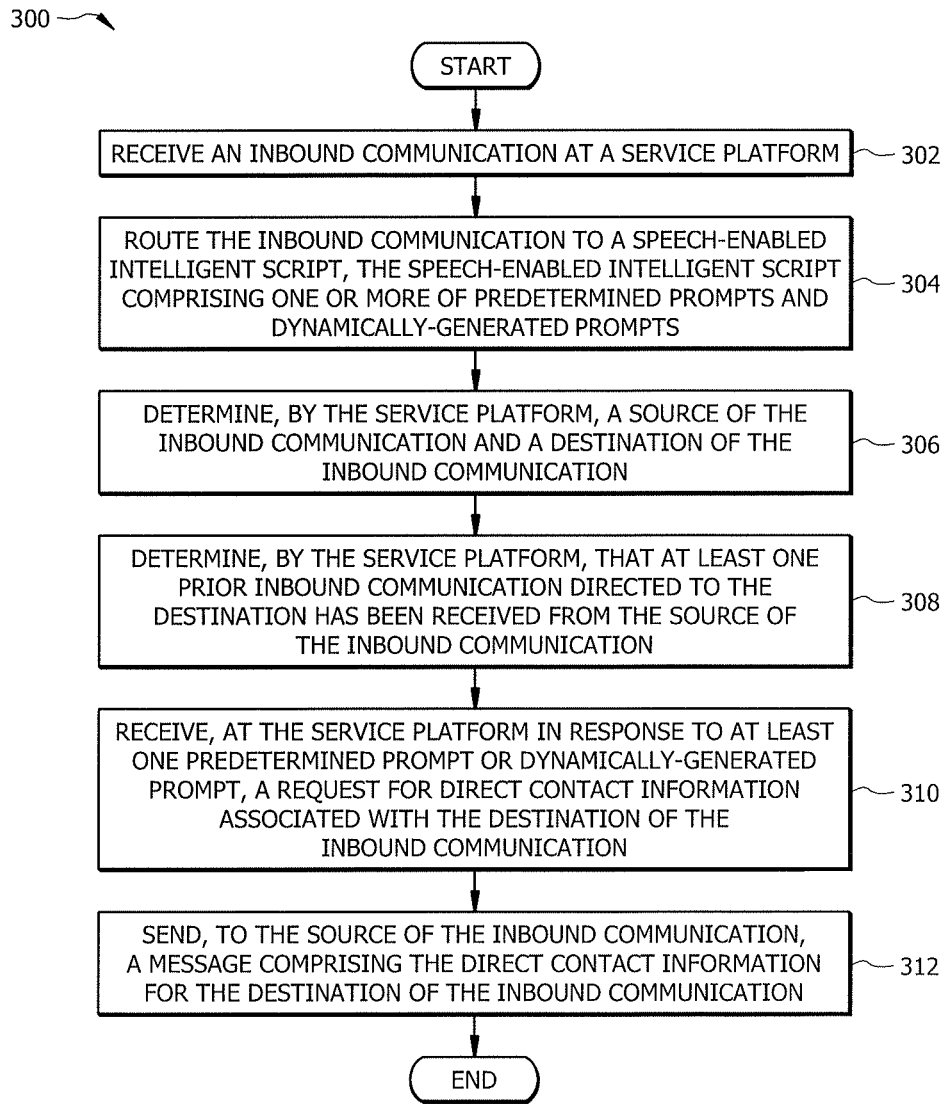
FIG. 3 is a flow diagram of an exemplary method for communications processing, in accordance with certain embodiments.

FIG. 3 is a flow diagram of an exemplary method 300 for communications processing, in accordance with certain embodiments. In the example embodiment of FIG. 3, the method is performed by a service platform associated with a call center (e.g., service platform 106 described above in relation to FIG. 1). In certain embodiments, the steps of method 300 may be performed by an applications server of the service platform (e.g., applications server 120 described above in relation to FIG. 1), alone or in combination with one or more other elements of the service platform (e.g., softswitch server 122, resource server 124, database server 126, and/or web server 128 described above in relation to FIG. 1).

Method 300 begins at step 302, where the service platform receives an inbound communication. In certain embodiments, the inbound communication may comprise one of: a call; and a text message.

At step 304, the service platform routes the inbound communication to a speech-enabled intelligent script, the speech-enabled intelligent script comprising one or more of predetermined prompts and dynamically-generated prompts.

At step 306, the service platform determines a source of the inbound communication and a destination of the inbound communication. At step 308, the service platform determines that at least one prior inbound communication directed to the destination has been received from the source of the inbound communication.

At step 310, the service platform receives, in response to at least one predetermined prompt or dynamically-generated prompt, a request for direct contact information associated with the destination of the inbound communication. In certain embodiments, the at least one predetermined prompt or dynamically-generated prompt may comprise an audio recording indicating that direct contact information associated with the destination of the inbound communication can be requested. The request for direct contact information associated with the destination of the inbound communication may comprise one of: speech input; and a keypad selection.

At step 312, the service platform sends, to the source of the inbound communication, a message comprising the direct contact information for the destination of the inbound communication. In certain embodiments, the method may comprise routing the inbound communication to the destination.

In certain embodiments, the method may comprise sending, to the destination of the inbound communication, a request for permission to route the inbound communication to the destination, the request comprising information identifying the source of the inbound communication. In certain embodiments, the method may further comprise receiving, at the service platform from the destination of the inbound communication, permission to route the inbound communication to the destination; and routing the inbound communication to the destination in response to receiving the permission.

In certain embodiments, the method may comprise: receiving, at the service platform from the destination of the inbound communication, a response to the request for permission indicating that the service platform is not permitted to route the inbound communication to the destination. In certain embodiments, the method may comprise in response to receiving the response to the request for permission indicating that the service platform is not permitted to route the inbound communication to the destination, sending contact information for the source of the inbound communication to the destination of the inbound communication.

In certain embodiments, the method may comprise: in response to receiving the response to the request for permission indicating that the service platform is not permitted to route the inbound communication to the destination, prompting the source of the inbound communication to leave one of a voice message or a text message for the destination; obtaining the voice message or the text message from the source of the inbound communication; and sending the obtained voice message or text message to the destination of the inbound communication.

In certain embodiments, the method may further comprise: receiving a subsequent inbound communication from the source; and routing the subsequent inbound communication directly to the destination.

In certain embodiments a computer program, computer program product or computer readable storage medium comprises instructions which when executed on a computer perform any of the embodiments disclosed herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A system, comprising:
a service platform comprising an applications server, the applications server configured to communicatively couple to a softswitch and a database, the applications server configured to:
receive an inbound communication;
route the inbound communication to a speech-enabled intelligent script, the speech-enabled intelligent script comprising one or more of predetermined prompts and dynamically-generated prompts;

determine a source of the inbound communication and a destination of the inbound communication, wherein the destination of the inbound communication is a destination at a business or other entity that has engaged a call center associated with the service platform to manage inbound communications;

determine that at least one prior inbound communication directed to the destination has been received from the source of the inbound communication;

receive, in response to at least one predetermined prompt or dynamically-generated prompt, a request for direct contact information associated with the destination of the inbound communication;

send, to the source of the inbound communication upon receipt of the request for direct contact information, a message in a textual format comprising the direct contact information for the destination of the inbound communication; and send, to the destination of the inbound communication, a request for permission to route the inbound communication to the destination, the request comprising information identifying the source of the inbound communication.

2. The system of claim 1, wherein the applications server is further configured to route the inbound communication to the destination.

3. The system of claim 1, wherein:
the at least one predetermined prompt or dynamically-generated prompt comprises an audio recording indicating that direct contact information associated with the destination of the inbound communication can be requested; and
the request for direct contact information associated with the destination of the inbound communication comprises one of:
speech input; and
a keypad selection.

4. The system of claim 1, wherein the applications server is further configured to:
receive, from the destination of the inbound communication, permission to route the inbound communication to the destination; and
route the inbound communication to the destination in response to receiving the permission.

5. The system of claim 1, wherein the applications server is further configured to receive, from the destination of the inbound communication, a response to the request for permission indicating that the service platform is not permitted to route the inbound communication to the destination.

6. The system of claim 5, wherein the applications server is further configured to, in response to receiving the response to the request for permission indicating that the service platform is not permitted to route the inbound communication to the destination, send contact information for the source of the inbound communication to the destination of the inbound communication.

7. The system of claim 5, wherein the applications server is further configured to:
in response to receiving the response to the request for permission indicating that the service platform is not permitted to route the inbound communication to the destination, prompt the source of the inbound communication to leave one of a voice message or a text message for the destination;

obtain the voice message or the text message from the source of the inbound communication; and
send the obtained voice message or text message to the destination of the inbound communication.

8. The system of claim 1, wherein the applications server is further configured to:
receive a subsequent inbound communication from the source; and
route the subsequent inbound communication directly to the destination.

9. The system of claim 1, wherein the inbound communication comprises one of:
a call; and
a text message.

10. A method, comprising:
receiving an inbound communication at a service platform, the service platform comprising an applications server configured to communicatively couple to a softswitch and a database;
routing the inbound communication to a speech-enabled intelligent script, the speech-enabled intelligent script comprising one or more of predetermined prompts and dynamically-generated prompts;
determining, by the service platform, a source of the inbound communication and a destination of the inbound communication, wherein the destination of the inbound communication is a destination at a business or other entity that is engaging a call center associated with the service platform to manage inbound communications;
determining, by the service platform, that at least one prior inbound communication directed to the destination has been received from the source of the inbound communication;
receiving, at the service platform in response to at least one predetermined prompt or dynamically-generated prompt, a request for direct contact information associated with the destination of the inbound communication;
sending, to the source of the inbound communication upon receiving the request for the direct contact information, a message in a textual format comprising the direct contact information for the destination of the inbound communication; and
sending, to the destination of the inbound communication, a request for permission to route the inbound communication to the destination, the request comprising information identifying the source of the inbound communication.

11. The method of claim 10, further comprising:
routing the inbound communication to the destination.

12. The method of claim 10, wherein:
the at least one predetermined prompt or dynamically-generated prompt comprises an audio recording indicating that direct contact information associated with the destination of the inbound communication can be requested; and
the request for direct contact information associated with the destination of the inbound communication comprises one of:
speech input; and
a keypad selection.

13. The method of claim 10, further comprising:
receiving, at the service platform from the destination of the inbound communication, permission to route the inbound communication to the destination; and routing the inbound communication to the destination in response to receiving the permission.

14. The method of claim 10, further comprising:
receiving, at the service platform from the destination of the inbound communication, a response to the request for permission indicating that the service platform is not permitted to route the inbound communication to the destination.

15. The method of claim 14, further comprising:
in response to receiving the response to the request for permission indicating that the service platform is not permitted to route the inbound communication to the destination, sending contact information for the source of the inbound communication to the destination of the inbound communication.

16. The method of claim 14, further comprising:
in response to receiving the response to the request for permission indicating that the service platform is not permitted to route the inbound communication to the destination, prompting the source of the inbound communication to leave one of a voice message or a text message for the destination;
obtaining the voice message or the text message from the source of the inbound communication; and
sending the obtained voice message or text message to the destination of the inbound communication.

17. The method of claim 10, further comprising:
receiving a subsequent inbound communication from the source; and
routing the subsequent inbound communication directly to the destination.

18. The method of claim 10, wherein the inbound communication comprises one of:
a call; and
a text message.

19. A non-transitory computer-readable medium comprising instructions that, when executed by a processor, are configured to perform a method, the method comprising:
receiving an inbound communication at a service platform, the service platform comprising an applications server configured to communicatively couple to a softswitch and a database;
routing the inbound communication to a speech-enabled intelligent script, the speech-enabled intelligent script comprising one or more of predetermined prompts and dynamically-generated prompts;
determining, by the service platform, a source of the inbound communication and a destination of the inbound communication, wherein the destination of the inbound communication is a destination at a business or other entity that is engaging a call center associated with the service platform to manage inbound communications;
determining, by the service platform, that at least one prior inbound communication directed to the destination has been received from the source of the inbound communication;
receiving, at the service platform in response to at least one predetermined prompt or dynamically-generated prompt, a request for direct contact information associated with the destination of the inbound communication;
sending, to the source of the inbound communication upon receiving the request for the direct contact information, a message in a textual format comprising the direct contact information for the destination of the inbound communication;
sending, to the destination of the inbound communication, a request for permission to route the inbound communication to the destination, the request comprising information identifying the source of the inbound communication;
receiving, at the service platform from the destination of the inbound communication, permission to route the inbound communication to the destination; and
routing the inbound communication to the destination in response to receiving the permission.

20. The medium of claim 19, further comprising:
receiving a subsequent inbound communication from the source; and
routing the subsequent inbound communication directly to the destination.

21. The medium of claim 19, wherein:
the at least one predetermined prompt or dynamically-generated prompt comprises an audio recording indicating that direct contact information associated with the destination of the inbound communication can be requested; and
the request for direct contact information associated with the destination of the inbound communication comprises one of:
speech input; and
a keypad selection.

* * * * *